(12) United States Patent
Fan et al.

(10) Patent No.: US 11,496,536 B2
(45) Date of Patent: Nov. 8, 2022

(54) METHOD OF REQUESTING VIDEO, COMPUTING DEVICE, AND COMPUTER-PROGRAM PRODUCT

(71) Applicant: Shanghai Bilibili Technology Co., Ltd., Shanghai (CN)

(72) Inventors: Wenjie Fan, Shanghai (CN); Zhaoxin Tan, Shanghai (CN); Jianqiang Ding, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/304,732

(22) Filed: Jun. 24, 2021

(65) Prior Publication Data
US 2021/0320957 A1    Oct. 14, 2021

Related U.S. Application Data

(63) Continuation of application No. PCT/CN2019/128454, filed on Dec. 25, 2019.

(30) Foreign Application Priority Data

Jan. 30, 2019    (CN) .......................... 201910092651.0

(51) Int. Cl.
*H04L 65/75*    (2022.01)
*H04N 21/2662*    (2011.01)
(Continued)

(52) U.S. Cl.
CPC ............ *H04L 65/75* (2022.05); *H04L 65/612* (2022.05); *H04L 65/65* (2022.05); *H04N 21/2662* (2013.01)

(58) Field of Classification Search
CPC . H04L 65/601; H04L 65/4084; H04L 65/608; H04N 21/2662; H04N 21/26258;
(Continued)

(56) References Cited

U.S. PATENT DOCUMENTS 9,426,543 B1    8/2016    Vuclip
2011/0119394 A1*    5/2011    Wang ...................... H04L 65/65
                                                                709/231
(Continued)

FOREIGN PATENT DOCUMENTS

CN    102857794 A    1/2013
CN    103384236 A    11/2013
(Continued)

OTHER PUBLICATIONS

Supplementary European Search Report of counterpart EP application No. 19912500.6, dated 15 Nov. 15, 2021, 1 page.
(Continued)

*Primary Examiner* — Tan Doan
(74) *Attorney, Agent, or Firm* — Kilpatrick Townsend & Stockton LLP (57) ABSTRACT

A method of requesting video is provided. The method includes: sending a first video request to a server in response to a video playing instruction, wherein, the server returns a video description information segment and a corresponding complete video according to the first video request, and the video includes a plurality of video segments, and the video description information segment is configured to describe each of the video segments; parsing the video description information segment; and playing the video in segments according to the parsed video description information segment in the process of downloading the video. The present application also provides a computing device and a computer-program product.

15 Claims, 7 Drawing Sheets

(51) Int. Cl.
*H04L 65/65* (2022.01)
*H04L 65/612* (2022.01)

(58) Field of Classification Search
CPC ........... H04N 21/6581; H04N 21/8456; H04N 21/47202; H04N 21/8543; H04N 21/437; H04N 21/438
USPC ........................................................ 709/231
See application file for complete search history.

(56) References Cited

U.S. PATENT DOCUMENTS

| | | | | |
|---|---|---|---|---|
| 2013/0227122 | A1* | 8/2013 | Gao | H04N 21/6373 709/224 |
| 2014/0304422 | A1* | 10/2014 | Di | H04L 65/762 709/231 |
| 2015/0271235 | A1* | 9/2015 | Zanger | H04L 65/4084 709/219 |
| 2016/0112953 | A1* | 4/2016 | Go | H04L 65/65 370/329 |
| 2016/0366617 | A1 | 12/2016 | Chen et al. | |

FOREIGN PATENT DOCUMENTS

| | | |
|---|---|---|
| CN | 103974147 A | 8/2014 |
| CN | 104244079 A | 12/2014 |
| CN | 106534946 A | 3/2017 |
| CN | 106921865 A | 7/2017 |
| CN | 106993237 A | 7/2017 |
| WO | 2017100769 A1 | 6/2017 |

OTHER PUBLICATIONS

Wei et al., "Low Latency Live Video Streaming Over HTTP 2.0," Proceedings of Network and Operating System Support on Digital Audio and Video Workshop, Mar. 19, 2014, pp. 37-42.

"Information technology—Dynamic adaptive streaming over HTTP (DASH)—Part 1: Media presentation description and segment formats," International Standard, Reference No. ISO/IEC 23009-1:2012(E), First edition, Apr. 1, 2012, 134 pages.

\* cited by examiner

FIG. 1

(RELATED ART)

METHOD OF REQUESTING VIDEO, COMPUTING DEVICE, AND COMPUTER-PROGRAM PRODUCT

CROSS-REFERENCE TO RELATED APPLICATIONS

The present application is a continuation under 35 U.S.C. 111(a) of PCT International Application No. PCT/CN2019/128454, filed on Dec. 25, 2019, which claims priority to Chinese patent application No. 201910092651.0, filed on Jan. 30, 2019, the entire contents of which are incorporated herein by reference in its entirety for all purposes.

TECHNICAL FIELD

The present application relates to a technical field of computer, and more particularly to a method of requesting video, a computing device, and a computer-program product.

BACKGROUND

DASH (Dynamic Adaptive Streaming over HTTP) is an adaptive bitrate streaming technology that can split a video into a plurality of segments, and each segment contains a playable content of a certain length. In related art, when a video is playing, an XMLHttpRequest request is usually sent once for each segment, for example, the video has 3 segments, and the XMLHttpRequest request must be sent at least 3 times.

However, in the process of implementing the concept of the present application, the inventors found that the related art has at least the following defects: in related art, when a video is playing, a plurality of XMLHttpRequest requests need to be sent. Because the request takes time, the video streaming efficiency is reduced. In addition, other programs may be inserted among the plurality of XMLHttpRequest requests, which affect parsing effect.

SUMMARY

The present application provides a method of requesting video, the method including: sending a first video request to a server in response to a video playing instruction, wherein the server returns a video description information segment and a corresponding complete video according to the first video request, the video includes a plurality of video segments, and the video description information segment is configured to describe each of the video segments; parsing the video description information segment; and playing the video in segments according to the parsed video description information segment during downloading of the video.

The present application also provides a computing device, which includes one or more processors and one or more non-transitory computer-readable storage mediums containing instructions configured to cause the one or more processors to implement the method described above.

Another aspect of the present application provides a non-transitory computer-program product tangibly embodied in a machine-readable non-transitory storage medium that includes instructions configured to cause one or more processors to implement the method described above.

DETAILED DESCRIPTION OF EMBODIMENTS

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

In the method of requesting video provided by the present application, a client sends a first video request to a server after receiving a video playing instruction. The server returns a byte stream to the client, where the byte stream includes a video description information segment and all video segments arranged in sequence corresponding to the first video request. The client will first download and parse the video description information segment, and then start to download the video. In the process of downloading the video, after a video segment is downloaded, the video segment can be parsed and then played in sequence. In the whole process, the first video request only needs to be sent once to watch the completed video. That is, embodiments of the present application avoid the disadvantages in related art that sending a plurality of requests for one video will consume time, reduce the efficiency of video streaming, and seriously affect the parsing effect due to the plurality of requests being inserted by other programs, thereby realizing the technical effect of reducing the request time and improving the efficiency of video streaming. And the video streaming in the embodiments of the present application is a continuous process, so it will not be affected by the insertion of other programs.

Figure 1:
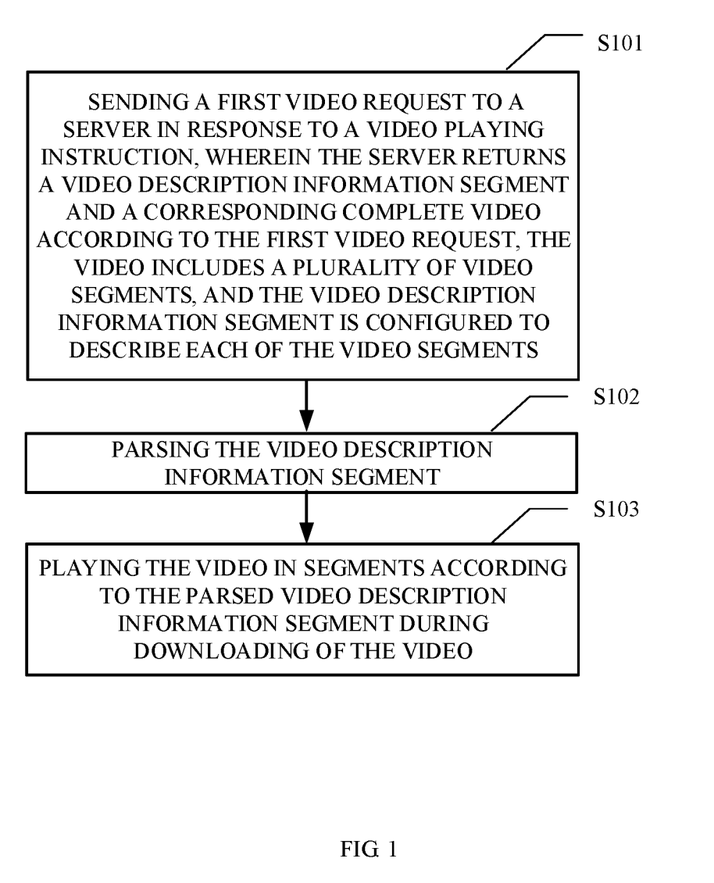
FIG. 1 illustrates a flowchart of a method of playing video according to some embodiments of the present application.

FIG. 1 illustrates a flowchart of a method of playing video according to some embodiments of the present application.

As shown in FIG. 1, the method of playing video may include steps S101 to S103.

Step S101, sending a first video request to a server in response to a video playing instruction. The server returns a video description information segment and a corresponding complete video according to the first video request, the video includes a plurality of video segments, and the video description information segment is configured to describe each of the video segments.

According to some embodiments of the present application, the method of playing video is applied to a DASH scene, and in the DASH scene, a video can be divided into a plurality of video segments. DASH is a dynamic adaptive stream based on HTTP, similar to HLS protocol, and DASH enables high quality streaming media can be transmitted over HTTP protocol through an adaptive bit rate streaming technology. DASH technology breaks streaming content into a series of small file segments based on HTTP, and each of the file segments contains a playable content with short length, while the total length of file content may be up to several hours (such as movies or sports events). The file content will be made into alternative segments with a plurality of bitrates to provide a plurality of bitrate versions for selection. When the file content is played back by the client, the client will automatically select which alternative to download and play according to a current network condition. The client will select the highest bitrate segment that can be downloaded in time for playing, so as to avoid playing stuck or rebuffering events. As a result, the client can seamlessly adapt to changing network conditions and provide high-quality playing experience, and has fewer occurrences of stuttering and rebuffering. In the embodiment of the present application, the server can divide the video content into a plurality of segments through DASH technology, and the length of each segment can be customized, such as 2 s, 5 s, 10 s, etc.

According to some embodiments of the present application, the method of playing video can be applied to the client, such as web. The first video request can include a fetch request, and the first video request does not include a request header. After receiving the first video request, the server can return a corresponding byte stream, which can include the video description information segment and a corresponding complete video. It should be noted that the server just returns the byte stream to the client, it does not mean that the client has completely received or downloaded the byte stream. The video description information segment may include an Initialization segment and an Index segment, and the video may be divided into a plurality of video segments, where the Initialization segment may include necessary metadata of the video, such as a width and height of the video, etc. The Index segment may include segment information of all video segments, and the segment information includes byte range, duration, and correspondence between byte and duration of the video segment corresponding to the segment information.

According to some embodiments of the present application, the server returns all of the complete videos, and then the client downloads the video step by step, and parses a video segment after downloading it, and then plays it in sequence. At this point, it should be need to know which bytes constitute a video segment, and need to know metadata of the video when playing, that is, in the embodiment of the present application, before downloading the video, the video description information segment needs to be downloaded first. Therefore, according to some embodiments of the present application, the method of playing video may further include: obtaining and parsing an MPD (Media Presentation Description) file of the video to obtain a byte range corresponding to the video description information segment before sending the first video request to the server; and downloading the video description information segment according to the byte range after sending the first video request to the server.

It should be noted that, the MPD file is a description file of video, which can be used to describe the composition of the whole MPEG DASH (also known as DASH) bitstream, and it is equivalent to M3U8 (M3U8 is a format of video) file of HLS (HTTP live streaming) protocol. The MPD file is an XML (Extensible Markup Language) Document (Document is a computer term, and each HTML (Hyper Text Markup Language) document loaded into the browser will become a Document object), and the content of the MPD file can construct a URL (Uniform Resource Locator) for HTTP GET request (HTTP GET requests are a way of HTTP requests) download. The MPD file can describe the segment information of each video segment, such as resolution, length and so on.

According to some embodiments of the present application, the MPD file may further includes a byte range of the video description information segment. The byte range of the video description information segment may be known by obtaining and parsing the MPD file, where the MPD file can be obtained by sending other requests to the server, such as XMLHttpRequest.

For example, by parsing the MPD file, it is known that the byte range of the video description information segment is 0-99 Byte, and then initiate a Fetch request, the server returns a byte stream, and the client first downloads data in a range of 0-99 Byte.

Step S102, parsing the video description information segment.

According to some embodiments of the present application, the parsing video description information segment can be a parsing initialization segment and an index segment. The metadata of the video can be known by parsing the initialization segment, and the segment information of the video can be known by parsing the index segment. According to some embodiments of the present application, the parsed video description information segment can be temporarily stored in memory.

For example, after parsing the video description information segment, the segment information of the video can be known, for example: video segment 1 is 1~5 s, corresponding to 100~299 Byte, is corresponding to 100 Byte, and 5 s corresponding to 299 Byte. Video segment 2 is 6~10 s, corresponding to 300~499 Byte, 6 s corresponding to 300 Byte, and 10 s corresponding to 499 Byte. Video segment 3 is 11~15 s, corresponding to 500~699 Byte, 11 s corresponding to 500 Byte, and 15 s corresponding to 699 Byte. Video segment 4 is 16~20 s, corresponding to 700~899 Byte, 16 s corresponding to 700 Byte, and 20 s corresponding to 899 Byte.

Step S103, playing the video in segments according to the parsed video description information segment in the process of downloading the video.

For example, the client downloads a remaining byte stream step by step. If the byte stream in the range of 100~299 Byte is downloaded, it can be parsed and played. If the byte stream in the range of 300~499 Byte is downloaded, it also can be parsed, and then after video segment 1 has finished playing, video segment 2 will be played, and so on.

In order to understand the difference between the solution and related art more clearly, a detailed description will now be given in combination with FIG. 2 and FIG. 3.

Figure 2:
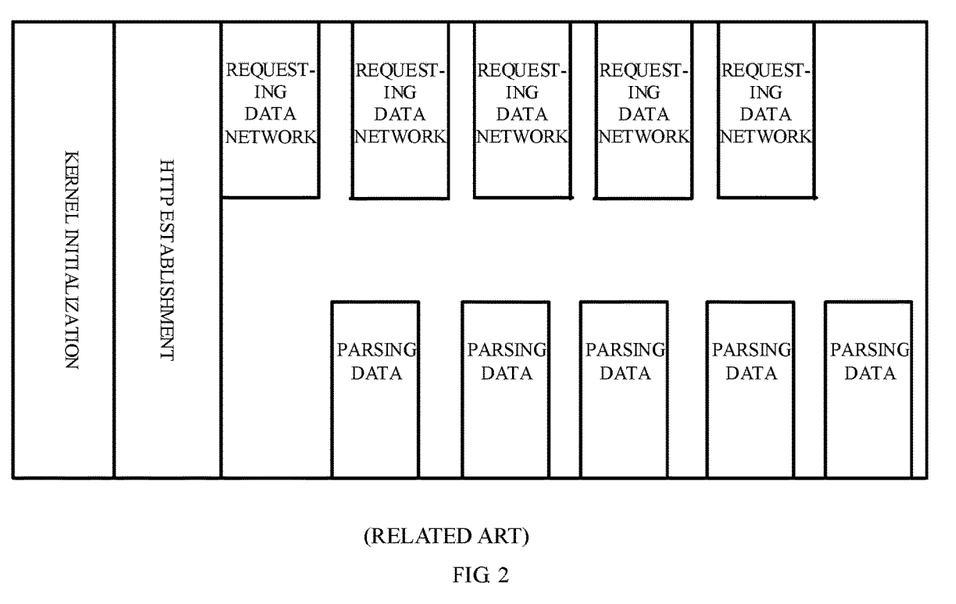
FIG. 2 illustrates a schematic diagram of a solution of playing video in the related art.

FIG. 2 illustrates a schematic diagram of a solution of playing video in related art. As shown in FIG. 2, when requesting a video, kernel initialization and http establishment are performed first, then a request (i.e., a request to a data network, such as an XMLHttpRequest request) is sent for each video segment, and then the data returned by each request is parsed.

Figure 3:
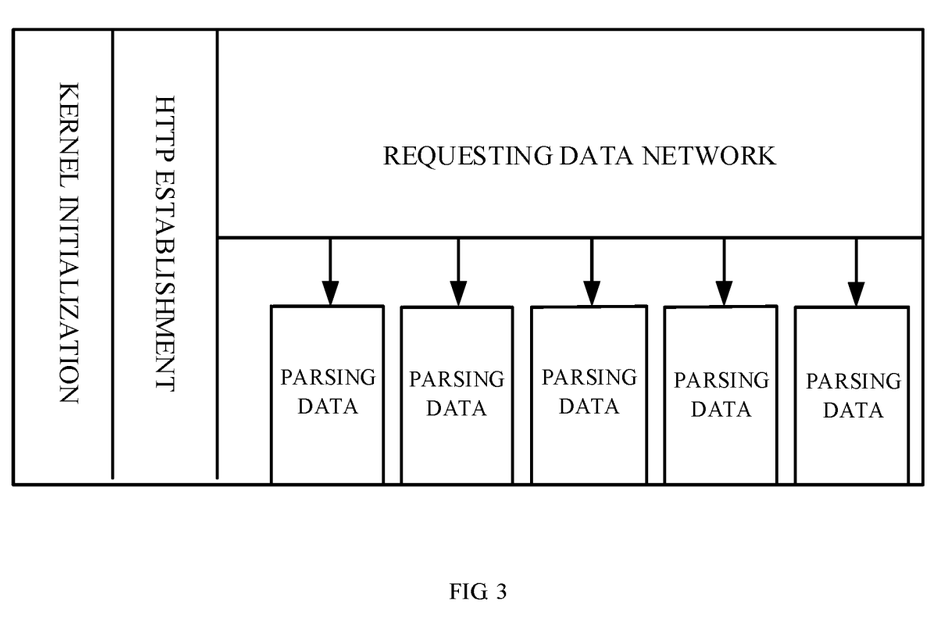
FIG. 3 illustrates a schematic diagram of a solution of playing video according to some embodiments of the present application.

FIG. 3 illustrates a schematic diagram of a solution of playing video according to some embodiments of the present application. As shown in FIG. 3, when requesting video, kernel initialization and http establishment are performed first, and then a video request (i.e., a request to a data network, such as a fetch request) is sent to the server. The server can return all the videos, and then the client can download the data step by step, and parse the data according to the segment information. Obviously, compared with the related art, the embodiments of the present application only need to send the first video request once when playing video.

According to some embodiments, in the method of requesting video provided by the present application, a client sends a first video request to a server after receiving a video playing instruction. The server returns a byte stream to the client, where the byte stream includes a video description information segment and all video segments arranged in sequence corresponding to the first video request. The client will first download and parse the video description information segment, and then start to download the video. In the process of downloading the video, after downloading a video segment, the client can parse the video segment and then play it in sequence. In the whole process, the client only needs to send the first video request once to watch the completed video. That is, embodiments of the present application avoid the disadvantages in related art that sending a plurality of requests for one video will consume time, reduce the efficiency of video streaming, and seriously affect the parsing effect due to the plurality of requests being inserted by other programs, thereby realizing the technical effect of reducing the request time and improving the efficiency of pulling video streams. The pulling of the video streams in the embodiments of the present application is a continuous process, so it will not be affected by the insertion of other programs.

According to some embodiments, the method of parsing video may further include: determining a byte length of a downloaded video corresponding to the first video request; determining whether the byte length of the downloaded video is greater than or equal to a first preset byte length; and disconnecting the first video request if the byte length of the downloaded video is greater than or equal to the first preset byte length.

According to some embodiments, sometimes the user does not watch the entire video at the same time. If the entire video is buffered for the user and the user only watches a small part of it, the traffic will be wasted. In some embodiments of the present application, in order to save traffic, a first preset byte length may be set. If the byte length of the downloaded video is greater than or equal to the first preset byte length, the first video request is disconnected, and the remaining video is no longer downloaded. Preferably, the first preset byte length is greater than the minimum byte length of the video segment.

For example, if the length of the first preset byte is 3000 Bytes, the Fetch request can be disconnected if a 3000 Byte video has been downloaded for the user.

Further, after disconnecting the first video request, the byte length (also known as the remaining buffer) of unplayed video in the downloaded video will gradually decrease as the video is playing. In order not to affect users' normal viewing, the method of parsing video may further include: determining a byte length of the unplayed video in the downloaded video; determining whether the byte length of the unplayed video is less than or equal to a second preset byte length; and sending a second video request to the server if the byte length of the unplayed video is less than or equal to the second preset byte length, where the second video request is configured to request a remaining video in the video except the downloaded video.

According to some embodiments, when the byte length of the unplayed video in the downloaded video is less than or equal to the second preset byte length (also referred to as the minimum buffer length), a new Fetch request may be initiated, where the Fetch request includes a request header, and a start byte of the range field of the request header is a byte corresponding to the end of the downloaded video.

For example, the corresponding byte range of the complete video is 100~1899 Byte, the corresponding byte range of the downloaded video is 100~999 Byte, and the second preset byte length is 300 Byte. If the playing position is 699 Byte at this time, the byte length of the unplayed video is 999-699=300 Byte. At this time, the client can send a new Fetch request to the server. The start byte of the range field of the Fetch request is 999 Byte, such as "999-", that is, the Fetch request is used to request from the server video data in the range of 999 to 1999 bytes.

In some embodiments, the method of parsing video may further include: determining a video node corresponding to the skip instruction in response to a skip instruction; determining whether the video node is within a range of the downloaded video; and disconnecting the first video request and sending a third video request to the server if the video node is not within the range of the downloaded video, where the third video request is configured to request a remaining video in the video starting from a byte corresponding to the video node.

According to some embodiments of the present application, the skip instruction may include a seek instruction, and the determining whether the video node is within a range of the downloaded video may be determining whether the time node corresponding to the video node is within the duration of the downloaded video, or determining whether the byte corresponding to the video node is within the byte range of the downloaded video. If yes, no additional operation is required, just start playing the video from the video node. If no, disconnecting the fetch request and initiating a new fetch request, where the fetch request includes the request header, and the start byte of the range field of the request header is the start byte of the video segment corresponding to the video node.

For example, the complete video is 40 s, the corresponding byte range is 100-1899 byte, the length of the downloaded video is 20 s, the corresponding byte range is 100-999 byte, the time node corresponding to the video node corresponding to the skip instruction is 30 s, and the corresponding byte is 1449 Byte, that is, the video node is not in the range of the downloaded video, then the client can send the new fetch request to the server. The start byte of the range field of the fetch request is 1449 byte, such as "1449-", that is the fetch request is configured to request from the server video data in the range of 1449-1899 byte.

In some embodiments, the method of parsing video may further include: determining a byte corresponding to the resolution switching instruction in response to a resolution switching instruction; sending a fourth video request to the server, where the fourth video request is configured to request a remaining video in a new resolution video starting from the byte corresponding to the resolution switching instruction, content of the new resolution video is the same as content of the video, and resolution of the new resolution video is different from resolution of the video.

According to some embodiments of the present application, the video description information segments of different resolution videos are different. In the scene of switching resolution, the Fetch request for requesting the video description information segment of a new resolution video may be first sent to the server, and the range of the range field of the Fetch request is the byte range of the video description information segment. Downloading and parsing the video description information segment, and then sending the fourth video request to the server, such as another Fetch request, the start byte of the range field of this Fetch request is the byte corresponding to resolution switching instruction.

For example, the byte range of the complete video is 100~1899 Byte, and the byte corresponding to the resolution switching instruction is 1200 Byte. The client can send the new Fetch request to the server, and the start byte of the range field of the Fetch request is 1200 Byte, such as "1200-", that is, the Fetch request is configured to request from the server video data in the range of 1200~1899 Byte.

In the method of requesting video provided by the present application, a client sends a first video request to a server after receiving a video playing instruction. The server returns a byte stream to the client, wherein the byte stream includes a video description information segment and all video segments arranged in sequence corresponding to the first video request. The client will first download and parse the video description information segment, and then start to download the video, and in the process of downloading the video, after downloading a video segment, the video segment can be parsed and then played in sequence. In the whole process, the first video request only needs to be sent once, so that the complete video can be watched. That is, embodiments of the present application avoid the disadvantages in the prior art that sending a plurality of requests for one video will consume time, reduce the efficiency of video streaming, and seriously affect the parsing effect due to the plurality of requests being inserted by other programs, thereby realizing the technical effect of reducing the request time and improving the efficiency of pulling video streams. The pulling of the video streams in the embodiments of the present application is a continuous process, so it will not be affected by the insertion of other programs.

Figure 4:
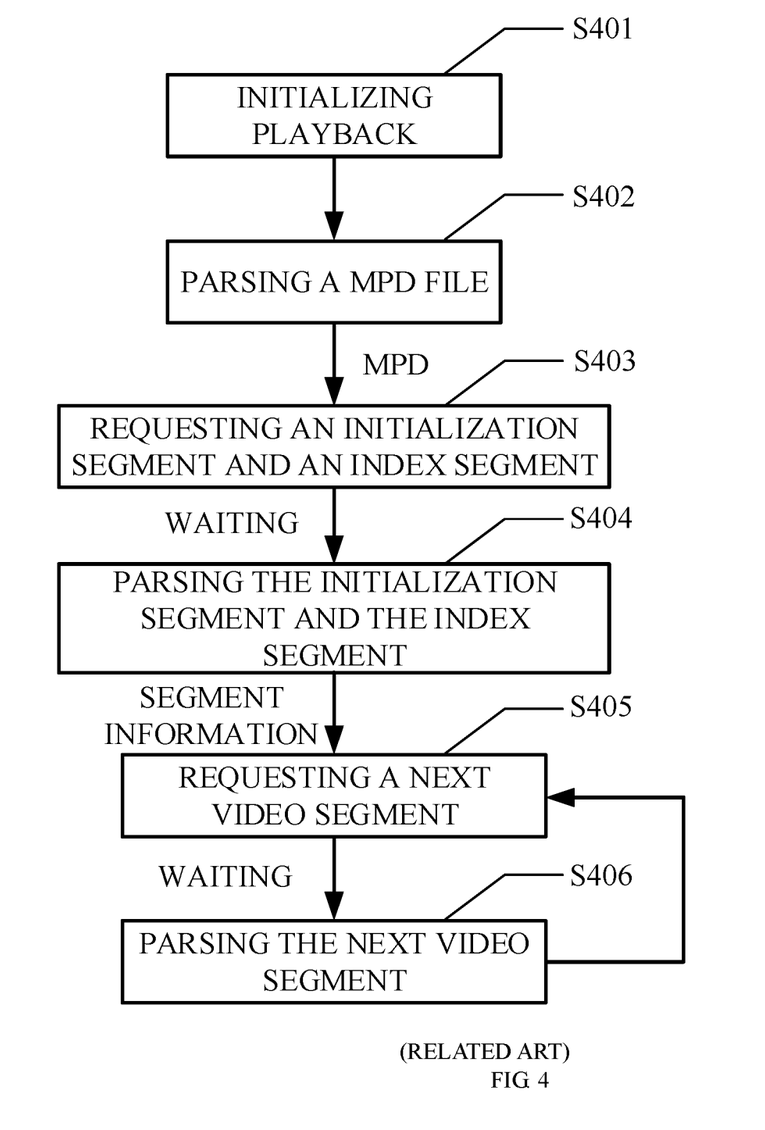
FIG. 4 illustrates a flowchart of a method of playing video in the related art.

FIG. 4 illustrates a flowchart of a method of playing video in the related art.

As shown in FIG. 4, the method of playing video in related art may include steps S401 to S406.

Step S401, initializing playback.
Step S402, parsing an MPD file.
Step S403, requesting an Initialization segment and an Index segment.
Step S404, parsing the Initialization segment and the Index segment.
Step S405, requesting a next video segment.
Step S406, parsing the next video segment.

It should be noted that DASH will divide the content into a series of small file segments based on HTTP, and each segment contains video information or a playable content with short length, and the client will select the highest bitrate segment that can be downloaded in time for playing, so as to avoid playing stuck or rebuffering events. There are three types of segment: Initialization segment, Index segment, and video segment. The Initialization segment contains metadata information necessary to render the video. The Index segment contains segment information of all video segments in the corresponding video. Video segment contains playable video content, and the range information of the Initialization segment and the Index segment are known in the MPD information.

XMLHttpRequest requests used in related art can only read data after the request is completed. Specifically, in related art, the client requests the Index segment and the Initialization segment first, and after the request and parsing are completed, the segment information of the video segment can be obtained from data of the Index segment. A new XMLHttpRequest request is used for each video segment, and a request address is a video address. The range field of the request header specifies the required byte range, such as "100-299", and the server returns the byte data in the range specified by the range field. For example, requesting a first video segment according to the segment information, then requesting a second video segment after the first video segment is requested and parsed, and so on.

Figure 5:
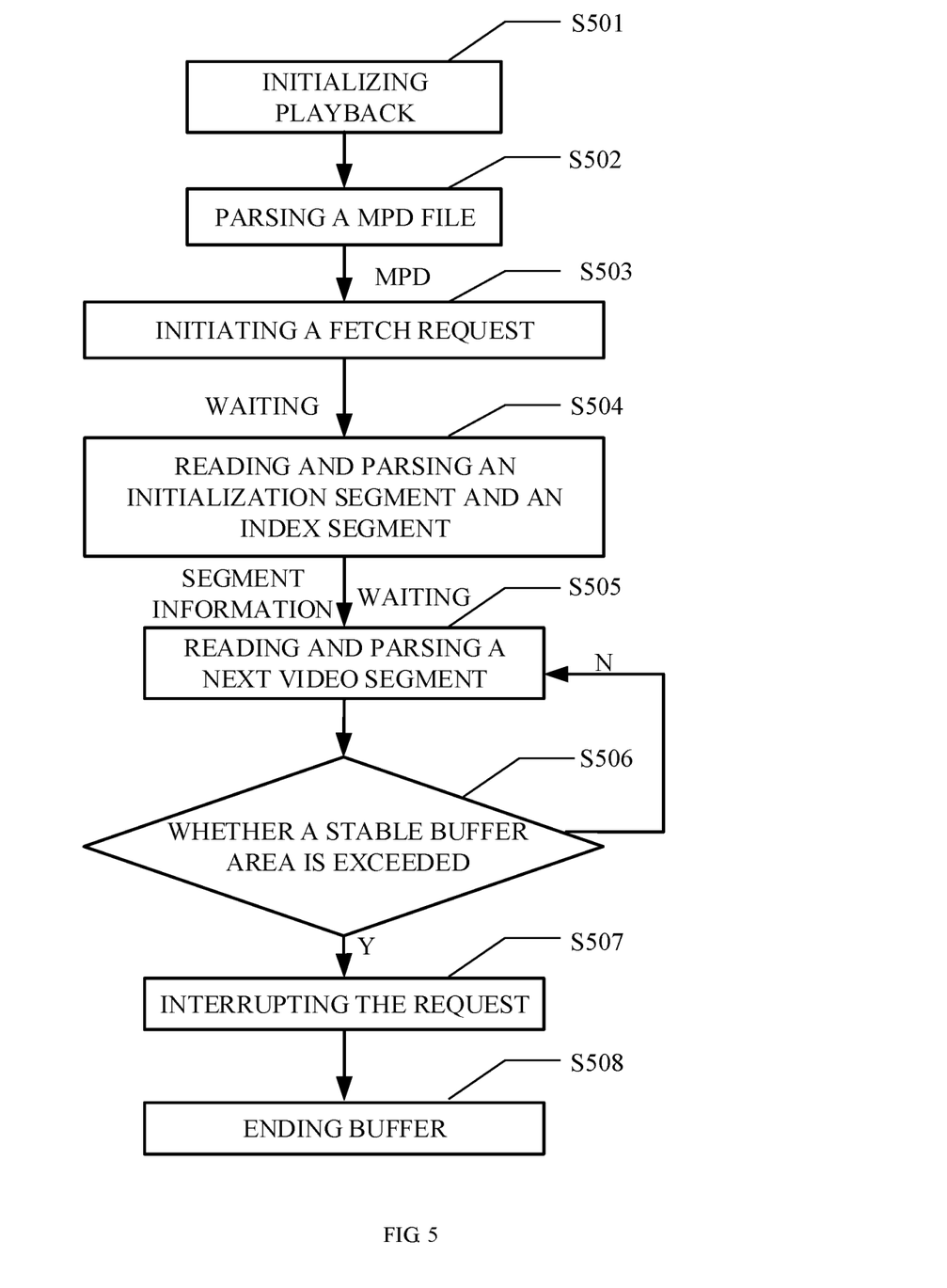
FIG. 5 illustrates a flowchart of a method of playing video according to some embodiments of the present application.

FIG. 5 illustrates a flowchart of a method of playing video according to some embodiments of the present application.

As shown in FIG. 5, the method of playing video may include steps S501 to S508.

Step S501, initializing playback.
Step S502, parsing an MPD file.
Step S503, initiating a Fetch request.
Step S504: reading and parsing an Initialization segment and an Index segment.
Step S505, reading and parsing a next video segment.
Step S506, determining whether a stable buffer area is exceeded. If yes, step S507 is performed, and if no, step S505 is performed.
Step S507, interrupting the request.
Step S508, ending buffer.

According to some embodiments of the present application, the Fetch request can be used to read byte stream cyclically during the request, so all the video segments can be requested only by establishing a connection once. A client first initiates a Fetch request without a request header to a video address, at this time, a server will return the complete video data. The client continuously downloads the video data and reads the byte stream cyclically in the process of downloading. The Index segment and Initialization segment positioned at the beginning of the byte stream, a range of which is known, will be downloaded and read by the client first. After the data of the complete Index segment and Initialization segment is obtained, it will be parsed by a parsing module. The segment information can be obtained after parsing data of the index segment. With the segment information obtained, it can be identified that which bytes form a complete video segment. After the data of the Index segment and the Initialization segment is parsed, the byte stream is continued to be read. Each time a complete video segment is read, it is sent to the parsing module for parsing. When the byte length of the downloaded video exceeds the byte length of a preset stable buffer (also known as a first preset byte length), the Fetch request is proactively disconnected.

The playing causes a remaining buffer (also known as the byte length of the unplayed video) to decrease. If the remaining buffer is less than the minimum buffer length (also known as the second preset byte length), a new Fetch request is initiated. This request starts with the byte corresponding to the end of the remaining buffer, and the range field of the request header is shaped like "1000-".

During seeking, if there is an unfinished Fetch request, the current request is interrupted when the seek time is outside the buffer (also known as the range of the downloaded video), and a new Fetch request starting from the byte corresponding to the seek time is initiated. No additional operation is required when the time is in the buffer; if there is no unfinished Fetch request, it is the same as the above playback scene.

When the resolution is switched, a Fetch request will be sent to a new resolution video address first. The range of the range field is the byte range of two segment of the Index segment and the Initialization segment, which is shaped like "0-1000", and after obtaining a new resolution segment information, another Fetch request is initiated, and the beginning of the range field is the byte corresponding to the video switching instruction, which is shaped like "1000-".

Figure 6:
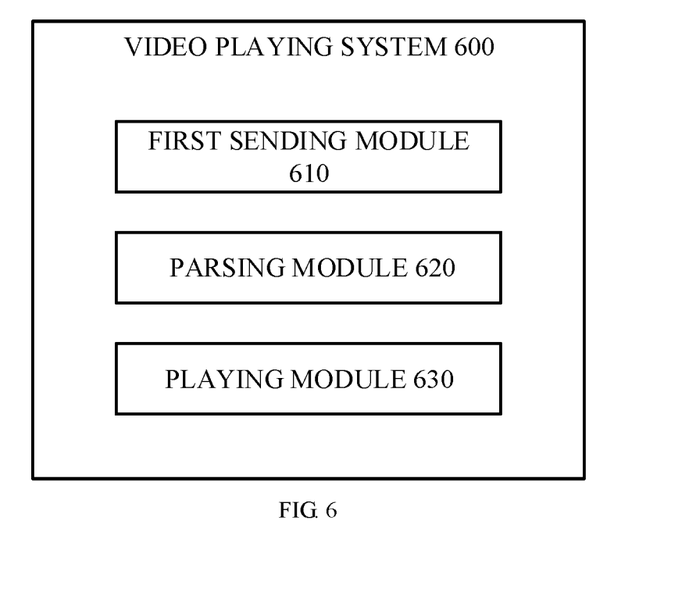
FIG. 6 illustrates a block diagram of a system of playing video according to some embodiments of the present application.

FIG. 6 illustrates a block diagram a system of parsing video according to an embodiment of the present application.

As shown in FIG. 6, the video parsing system 600 may include a first sending module 610, a parsing module 620, and a playing module 630.

The first sending module 610 is configured to send a first video request to a server in response to a video playing instruction. The server returns a video description information segment and a corresponding complete video according to the first video request, the video includes a plurality of video segments, and the video description information segment is configured to describe each of the video segments.

The parsing module 620 is configured to parse the video description information segment.

The playing module 630 is configured to play the video in segments according to the parsed video description information segment in the process of downloading the video.

According to the system of requesting video provided by the present application, a client sends a first video request to a server after receiving a video playing instruction. The server returns a byte stream to the client, where the byte stream includes a video description information segment and all video segments arranged in sequence corresponding to the first video request. The client will first download and parse the video description information segment, and then start to download the video. And in the process of downloading the video, after downloading a video segment, the client can parse the video segment and then play it in sequence. In the whole process, the first video request only needs to be sent once to watch the completed video. That is, embodiments of the present application avoid the disadvantages in related art that sending a plurality of requests for one video will consume time, reduce the efficiency of pulling video streams, and seriously affect the parsing effect due to the plurality of requests being inserted by other programs, realizing the technical effect of reducing the request time and improving the efficiency of pulling video streams. The pulling of the video streams in some embodiments of the present application is a continuous process, so it will not be affected by the insertion of other programs.

In some embodiments, the system of requesting video may further include: an obtaining module for obtaining and parsing an MPD file of the video to obtain a byte range corresponding to the video description information segment before sending the first video request to the server; and a downloading module for downloading the video description information segment according to the byte range after sending the first video request to the server.

In some embodiments, the system of requesting video may further include: a first determining module for determining a byte length of a downloaded video corresponding to the first video request; a first judging module for determining whether the byte length of the downloaded video is greater than or equal to a first preset byte length; and a disconnecting module, disconnecting the first video request if the byte length of the downloaded video is greater than or equal to the first preset byte length.

In some embodiments the system of requesting video may further include: a second determining module for determining a byte length of unplayed video in the downloaded video; a second judging module for determining whether the byte length of the unplayed video is less than or equal to a second preset byte length; and a second sending module, sending a second video request to the server if the byte length of the unplayed video is less than or equal to the second preset byte length, where the second video request is configured to request a remaining video in the video except the downloaded video.

In some embodiments, the system of requesting video may further include: a third determining module for determine a video node corresponding to the skip instruction in response to a skip instruction; a third judging module for determining whether the video node is within a range of the downloaded video; and a processing module, disconnecting the first video request and sending a third video request to the server if the video node is not within the range of the downloaded video, where the third video request is configured to request a remaining video in the video starting from the byte corresponding to the video node.

In some embodiments, the system of requesting video may further include: a fourth determining module for determine a byte corresponding to the resolution switching instruction in response to a resolution switching instruction; a third sending module for sending a fourth video request to the server, where the fourth video request is configured to request a remaining video in a new resolution video starting from the byte corresponding to the resolution switching instruction, and content of the new resolution video is the same as content of the video, and resolution of the new resolution video is different from resolution of the video.

Figure 7:
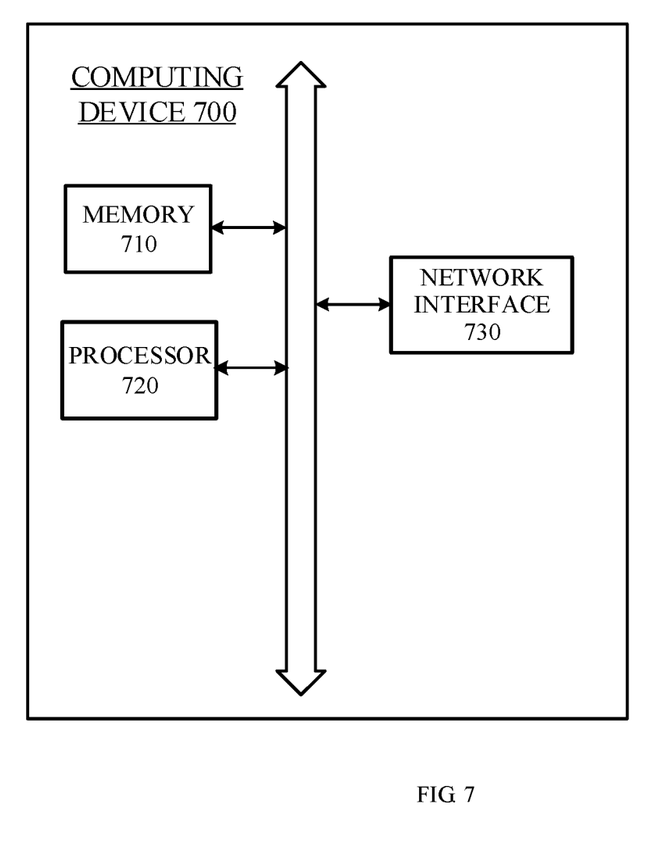
FIG. 7 illustrates a diagram of hardware architecture of a computing device suitable for implementing a method of playing video according to some embodiments of the present application.

FIG. 7 illustrates a diagram of hardware architecture of a computing device suitable for implementing a method of playing video according to some embodiments of the present application. In the embodiment, the computing device 700 is a device capable of automatically performing numerical calculations and/or information processing according to predefined or stored instructions. For example, it can be a smartphone, tablet, laptop, desktop computer, rack server, blade server, tower server, or cabinet server (including stand-alone servers, or a cluster of a plurality of servers), and so on. As shown in FIG. 7, the computing device 700 includes, but is not limited to, a memory 710, a processor 720, and a network interface 730 that can be communicated with each other through a system bus.

The memory 710 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 710 may be an internal storage module of the computing device 700 such as a hard disk or memory of the computing device 700. In other embodiments, the memory 710 may also be an external storage device of the computing device 700, such as a plugged hard disk, a smart media card (SMC), secure digital (SD) card, or a flash memory card provided on the computing device 700. Of course, the memory 710 may also include both an internal storage module and an external storage device of the computing device 700. In the embodiment, the memory 710 is generally used to store an operating system and various types of application software installed in the computing device 700 such as program codes of the method of playing video. In addition, the memory 710 may also be used to temporarily store various types of data that have been or will be outputted.

The processor 720, in some embodiments, may be a central processing unit (CPU), a controller, a microprocessor, or other data processing chip. The processor 720 is generally used to control the overall operation of the computing device 700 such as performing control and processing related to data interaction or communication with the computing device 700. In some embodiments, the processor 720 is used to run program code stored in the memory 710 or process data.

The network interface 730 may include a wireless network interface or a wired network interface which is generally used to establish a communication connection between the computing device 700 and other computing devices. For example, the network interface 730 is used for connecting the computing device 700 to an external terminal via a network and establishing a data transmission channel and a communication connection between the computing device 700 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 7 shows only a computing device 700 having components 710-730, but it is understood that it is not required to implement all of the shown components and that more or fewer parts can be implemented in lieu thereof.

According to some embodiments, a method of playing video stored in the memory 710 may be divided into one or more program modules and executed by one or more processors (processor 720 in the embodiment) to complete the present application.

According to some embodiments a non-transitory computer-readable storage medium is provided, wherein the one or more programs further comprise instructions that, when executed by one or more processors of a computing device, cause the computing device to perform operations comprising:

sending a first video request to a serve in response to a video playing instruction, where the server returns a video description information segment and a corresponding complete video according to the first video request, and the video includes a plurality of video segments, and the video description information segment is configured to describe each of the video segments;

parsing the video description information segment; and playing the video in segments according to the parsed video description information segment in the process of downloading the video.

In some embodiments, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In other embodiments, the computer-readable storage medium may also be an external storage device of the computing device, such as a plugged hard disk, a smart media card (SMC), secure digital (SD) card, a flash memory card provided on the computing device. Of course, the computer-readable storage medium may also include both an internal storage module and an external storage device of the computing device. In the embodiment, the computer-readable storage medium is generally used to store an operating system and various types of application software installed in the computing device such as program codes of the method of playing video. In addition, the computer-readable storage medium may also be used to temporarily store various types of data that have been or will be outputted.

Apparently, it should be appreciated by those skilled in the art that each module or step described in the embodiment of the present application can be realized by a general-purpose computing device and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:

sending a first video request to a server in response to a video playing instruction, wherein the server returns a video description information segment and a corresponding complete video according to the first video request, the video includes a plurality of video segments, and the video description information segment is configured to describe each of the video segments;

parsing the video description information segment; and playing the video in segments according to the parsed video description information segment during downloading of the video, wherein the method further comprises:

obtaining and parsing, before sending the first video request to the server, a Media Presentation Description (MPD) file of the video to obtain a byte range corresponding to the video description information segment; and downloading the video description information segment according to the byte range after sending the first video request to the server.

2. The method of claim 1, further comprising:

determining a byte length of a downloaded video corresponding to the first video request;

determining whether the byte length of the downloaded video is greater than or equal to a first preset byte length; and disconnecting the first video request in response to determining that the byte length of the downloaded video is greater than or equal to the first preset byte length.

3. The method of claim 2, further comprising:

determining a byte length of unplayed video in the downloaded video;

determining whether the byte length of the unplayed video is less than or equal to a second preset byte length; and sending a second video request to the server in response to determining that the byte length of the unplayed video is less than or equal to the second preset byte length, wherein the second video request is configured to request a remaining video in the video except the downloaded video.

4. The method of claim 2, further comprising:
determining, in response to a skip instruction, a video node corresponding to the skip instruction;
determining whether the video node is within a range of the downloaded video; and
disconnecting the first video request and sending a third video request to the server in response to determining that the video node is not within the range of the downloaded video, wherein the third video request is configured to request a remaining video in the video starting from a byte corresponding to the video node.

5. The method of claim 1, further comprising:
determining, in response to a resolution switching instruction, a byte corresponding to the resolution switching instruction; and
sending a fourth video request to the server, wherein the fourth video request is configured to request a remaining video in a new resolution video starting from the byte corresponding to the resolution switching instruction, and content of the new resolution video is same as content of the video, and a resolution of the new resolution video is different from a resolution of the video.

6. A computing device comprising:
one or more processors; and
one or more non-transitory computer-readable storage mediums containing instructions configured to cause the one or more processors to perform operations including:
sending a first video request to a server in response to a video playing instruction, wherein the server returns a video description information segment and a corresponding complete video according to the first video request, and the video includes a plurality of video segments, and the video description information segment is configured to describe each of the video segments;
parsing the video description information segment; and
playing the video in segments according to the parsed video description information segment during downloading of the video, wherein the one or more non-transitory computer-readable storage mediums further contain instructions configured to cause the one or more processors to perform operations including:
obtaining and parsing, before sending the first video request to the server, a Media Presentation Description (MPD) file of the video to obtain a byte range corresponding to the video description information segment; and
downloading the video description information segment according to the byte range after sending the first video request to the server.

7. The computing device of claim 6, wherein the one or more non-transitory computer-readable storage mediums further contain instructions configured to cause the one or more processors to perform operations including:
determining a byte length of a downloaded video corresponding to the first video request;
determining whether the byte length of the downloaded video is greater than or equal to a first preset byte length; and
disconnecting the first video request in response to determining that the byte length of the downloaded video is greater than or equal to the first preset byte length.

8. The computing device of claim 7, wherein the one or more non-transitory computer-readable storage mediums further contain instructions configured to cause the one or more processors to perform operations including:
determining a byte length of unplayed video in the downloaded video;
determining whether the byte length of the unplayed video is less than or equal to a second preset byte length; and
sending a second video request to the server in response to determining that the byte length of the unplayed video is less than or equal to the second preset byte length, wherein the second video request is configured to request a remaining video in the video except the downloaded video.

9. The computing device of claim 7, wherein the one or more non-transitory computer-readable storage mediums further contain instructions configured to cause the one or more processors to perform operations including:
determining, in response to a skip instruction, a video node corresponding to the skip instruction;
determining whether the video node is within a range of the downloaded video; and
disconnecting the first video request and sending a third video request to the server in response to determining that the video node is not within the range of the downloaded video, wherein the third video request is configured to request a remaining video in the video starting from a byte corresponding to the video node.

10. The computing device of claim 6, wherein the one or more non-transitory computer-readable storage mediums further contain instructions configured to cause the one or more processors to perform operations including:
determining, in response to a resolution switching instruction, a byte corresponding to the resolution switching instruction; and
sending a fourth video request to the server, wherein the fourth video request is configured to request a remaining video in a new resolution video starting from the byte corresponding to the resolution switching instruction, and content of the new resolution video is the same as content of the video, and a resolution of the new resolution video is different from a resolution of the video.

11. A non-transitory computer-program product tangibly embodied in a machine-readable non-transitory storage medium that includes instructions configured to cause one or more processors to:
send a first video request to a server in response to a video playing instruction, wherein the server returns a video description information segment and a corresponding complete video according to the first video request, the video includes a plurality of video segments, and the video description information segment is configured to describe each of the video segments;
parse the video description information segment; and
play the video in segments according to the parsed video description information segment during downloading of the video, wherein the non-transitory computer-program product further comprises instructions causing the one or more processors to:
obtain and parse, before sending the first video request to the server, a Media Presentation Description (MPD) file of the video to obtain a byte range corresponding to the video description information segment; and download the video description information segment according to the byte range after sending the first video request to the server.

12. The non-transitory computer-program product of claim 11, wherein the non-transitory computer-program product further comprises instructions causing the one or more processors to:

determine a byte length of a downloaded video corresponding to the first video request;

determine whether the byte length of the downloaded video is greater than or equal to a first preset byte length; and disconnect the first video request in response to determining that the byte length of the downloaded video is greater than or equal to the first preset byte length.

13. The non-transitory computer-program product of claim 12, wherein the non-transitory computer-program product further comprises instructions causing the one or more processors to:

determine a byte length of unplayed video in the downloaded video;

determine whether the byte length of the unplayed video is less than or equal to a second preset byte length; and send a second video request to the server in response to determining that the byte length of the unplayed video is less than or equal to the second preset byte length, wherein the second video request is configured to request a remaining video in the video except the downloaded video.

14. The non-transitory computer-program product of claim 13, wherein the non-transitory computer-program product further comprises instructions causing the one or more processors to:

determine, in response to a resolution switching instruction, a byte corresponding to the resolution switching instruction; and send a fourth video request to the server, wherein the fourth video request is configured to request a remaining video in a new resolution video starting from the byte corresponding to the resolution switching instruction, and content of the new resolution video is the same as content of the video, and a resolution of the new resolution video is different from a resolution of the video.

15. The non-transitory computer-program product of claim 12, wherein the non-transitory computer-program product further comprises instructions causing the one or more processors to:

determine, in response to a skip instruction, a video node corresponding to the skip instruction;

determine whether the video node is within a range of the downloaded video; and disconnect the first video request and send a third video request to the server in response to determining that the video node is not within the range of the downloaded video, wherein the third video request is configured to request a remaining video in the video starting from a byte corresponding to the video node.

* * * * *